(12) United States Patent
Amer-Yahia et al.

(10) Patent No.: US 8,073,794 B2
(45) Date of Patent: Dec. 6, 2011

(54) SOCIAL BEHAVIOR ANALYSIS AND INFERRING SOCIAL NETWORKS FOR A RECOMMENDATION SYSTEM

(75) Inventors: Sihem Amer-Yahia, New York, NY (US); Evgeniy Gabrilovich, Sunnyvale, CA (US); Bo Pang, Sunnyvale, CA (US); Julia Stoyanovich, New York, NY (US); Cong Yu, New York, NY (US)

(73) Assignee: YAHOO! Inc., Sunnyvale, CA (US)

( * ) Notice: Subject to any disclaimer, the term of this patent is extended or adjusted under 35 U.S.C. 154(b) by 869 days.

(21) Appl. No.: 11/961,555

(22) Filed: Dec. 20, 2007

(65) Prior Publication Data

US 2009/0164400 A1    Jun. 25, 2009

(51) Int. Cl.
*G06F 17/00* (2006.01)
*G06N 5/00* (2006.01)
(52) U.S. Cl. .......................................... 706/45
(58) Field of Classification Search ...................... 706/45
See application file for complete search history.

(56) References Cited

U.S. PATENT DOCUMENTS

| | | | |
|---|---|---|---|
| 5,918,014 A * | 6/1999 | Robinson | 709/219 |
| 6,947,922 B1 * | 9/2005 | Glance | 705/26.1 |
| 7,403,910 B1 * | 7/2008 | Hastings et al. | 705/26 |
| 7,680,770 B1 * | 3/2010 | Buyukkokten et al. | 707/758 |
| 2002/0040363 A1 * | 4/2002 | Wolfman et al. | 707/5 |
| 2006/0036592 A1 * | 2/2006 | Das et al. | 707/4 |
| 2007/0073745 A1 * | 3/2007 | Scott et al. | 707/100 |
| 2008/0134043 A1 * | 6/2008 | Georgis et al. | 715/733 |
| 2008/0147722 A1 * | 6/2008 | Dolin et al. | 707/103 R |
| 2008/0243638 A1 * | 10/2008 | Chan et al. | 705/27 |
| 2008/0294621 A1 * | 11/2008 | Kanigsberg et al. | 707/5 |
| 2008/0294622 A1 * | 11/2008 | Kanigsberg et al. | 707/5 |
| 2009/0006442 A1 * | 1/2009 | Anderson et al. | 707/102 |

* cited by examiner

*Primary Examiner* — Jeffrey A Gaffin
*Assistant Examiner* — Vincent Gonzales
(74) *Attorney, Agent, or Firm* — Berkeley Law & Technology Group, LLP (57) ABSTRACT

Systems and methods are provided for determining items or people of potential interest to recommend to users in a computer-based network. Implied social networks may be determined based at least in part on obtained social behavior information. Items or people of potential interest to users may be determined based at least in part on implied social network information. Vocabulary taxonomies may be associated with, or used in determining, implied social networks.

20 Claims, 6 Drawing Sheets

SOCIAL BEHAVIOR ANALYSIS AND INFERRING SOCIAL NETWORKS FOR A RECOMMENDATION SYSTEM

TECHNICAL FIELD

The present disclosure generally relates to computer-based recommendation systems.

BACKGROUND

Social behavior and social networks are increasingly common, complex, and important on the Internet and other networks. Furthermore, recommendation systems and methods that recommend items or people of interest or potential interest to particular users are evolving and are increasingly useful and profitable. Better recommendation systems can reward users for active social behavior, encouraging greater levels of participation in sites or applications having social aspects.

DESCRIPTION OF PREFERRED EMBODIMENT(S)

Herein, each of the terms "vocabulary" and "vocabulary taxonomy" broadly include, among other things, any combination of words, groups of words, groups of terms, groups of phrases, or other verbal constructions, and may include various other information, in various forms, relating to such words, terms, or phrases. Such other information may include information relating to semantics, synonymy or antonym, hierarchy, inclusion, relationships, interdependencies, analysis, etc. Such information may include meaning information, hierarchy information, etc. A vocabulary taxonomy may consist of as little as a group of words or terms, or may include other information.

Herein, the term "implied social network" can broadly include a group of users or other individuals determined to be associated or associatable in some way, based on one or more characteristics, behaviors, or properties, or other information, even though such users may or may not be explicitly associated with each other, such as be being together in a declared group. Further, an implied social network can include or be added to, integrated with, or in combination with one or more explicit social networks. Still further, an "implied topic-specific social network" includes an implied social network that is associated with one or more specific topics, subjects, areas, etc.

Herein, items or people of potential interest can broadly include, among other things, content, things, products, services, or various other identifiable or indictable things, entities, concepts, etc. For example, items can include items that a user may wish to view, watch, read, experience, interact with, investigate, purchase, etc. People can include users, contacts, names, other identifications, etc., including people recommended for contact, investigation, or interaction by a user, for friendship or other association, or even for dating, etc.

Social behavior, as used herein, broadly includes various forms of behavior by people or users. Social behavior by users can include any form of conduct or activity that is or can be connected in some way with other users, or anything pertaining to other users.

Social behavior, including computer-based social behavior, can take a variety of forms. Users can establish explicit networks of friends through various applications and in various contexts. Also, any form of user to user connection or communication, whether explicit or implicit, is a form of social behavior. Social behavior can also be exhibited in connection with content. Content-related social behavior can include activities such as bookmarking, tagging, content sharing, blogging, or other explicit or implicit indications of interest or preference. Social behavior can also include behavior in a wireless context, such as input or interaction with a wireless, handheld, or portable device such as a cell phone, PDA, or other device or interface.

In some embodiments, social networks may be determined, derived, or inferred based on social behavior of users, such as tagging, or comparison thereof. For example, commonalities, connections or patterns in social behavior of different users may be determined, such as a common topic of interest. Such commonalities, connections or patterns may then be used to aid in determining items or people to recommend to users. For example, recommended items can include popular items by users in an implied social network (or combined network including explicit and implied network information), items of interest to particular users exhibiting similar tagging patterns to another user, etc.

In some embodiments, a group of users determined to share a topic of interest may be associated with a topic-specific vocabulary taxonomy, or such a vocabulary taxonomy may be developed in connection with such a group, or both.

In some embodiments, particular vocabularies and vocabulary taxonomies may be generated and used. Such vocabulary taxonomies may be used to infer or to help infer or determine implied social networks, or vice versa, or both. The vocabulary taxonomies may be semantically-sensitive. Semantically-sensitive vocabulary taxonomies can include those that capture not only words but information about meanings, hierarchies of terms, synonyms, etc, to more accurately and richly represent a vocabulary.

Embodiments of the present invention are included that relate to recommendation systems methods for computer users, and techniques for use for, with or in such recommendation systems and methods. Such determinations and presentations may be made based at least in part on computer-based user social behavior, such as tagging, bookmarking, etc. In some embodiments, analysis of social behavior can include mathematical, algorithmic, or statistical analysis to determine a connection or strength of a connection between users, groups of users, topics, content, or combinations thereof. Such analysis can then be used in determining items or people of potential interest to particular users.

"Tag space", as used herein, can include various forms of, and structures for, mathematical, algorithmic, or statistical analysis or determinations. For example, a tag space may include or induce a multidimensional space, wherein aspects such as axes in the space represent or allow a quantization of particular entities or factors. Furthermore, a tag space may include, facilitate or incorporate factors relating to tagging or other forms of social behavior, as well as factors relating to vocabularies, vocabulary terms, vocabulary taxonomies, and vocabulary usage by a user or a group of users, etc. Vectors or distances between points in the tag space may be utilized to determine or estimate similarities between users, user behaviors, tagging, vocabularies, terms of vocabularies or vocabulary taxonomies, and other determinations of interest or use.

In some embodiments, items or people determined to be of potential interest may be recommended to a user. The recommendation may be accompanied by an explanation of the determination or rationale for the recommendation, such as a visual explanation or annotation which may include vocabulary words, terms, or hierarchies. The recommendations and explanations may encourage active social behavior and influence user behavior such as tagging, which may then improve future implied network determinations and recommendations, etc. Also, users may be provided with an opportunity to provide feedback that may be used to assess the quality of or validate recommendations or explanations, which feedback can then be utilized to improve the quality of future recommendations. In some embodiments, over cycles, users are encouraged to participate more actively in social sites, and are better able to enjoy a wider range or content and more relevant available content, on the Web or a more specific network. Active social behavior is rewarded by improved quality of recommendations.

For example, in some embodiments, a user can validate recommended content by providing feedback through a graphical user interface. This interface enables the user to provide, for example, positive or negative feedback, or validate the recommendation by tagging and voting. This feedback can then be used to refine or improve future recommendation determinations and recommendations.

In some embodiments, social behavior among a group of users may be used in determining items or people to recommend to particular users. Social behavior may be used to determine implied social networks, which may then be used in determining items or people of potential or likely interest to recommend to particular users (or vice-versa, or both). The implied social networks may be used themselves, or in addition or combined with explicit social networks. A vocabulary or vocabulary taxonomy may be used in determining implied social networks. The vocabulary taxonomy or aspects of it may take into account or otherwise be influenced by semantics. The implied social networks may be topic-specific.

In some embodiments, a vocabulary taxonomy may be used to determine implied topic-specific social networks (or vice versa, or both). The implied topic-specific social network may be used in determining items or people of potential interest to recommend to particular users.

Presentations, such as graphical user interfaces, may be generated or provided to a user, including a recommendation of an item. The vocabulary taxonomy may be semantically-sensitive. The presentation may include annotations or other indications relating to the rationale utilized in the determination to recommend the item to the user. Such annotations may include reference to or words from the pertinent vocabulary taxonomy.

The user may be provided with an interface and opportunity to provide feedback relating to the recommendation or its rationale. The feedback may be utilized to enhance or improve future recommendation determinations and recommendations. In some embodiments, vocabularies or vocabulary taxonomies are not static once generated, but may be modified or added to based on factors including additional tagging behavior, user feedback, implied social network information, and other gathered information.

In some embodiments, aspects, factors, or entities used to make determinations or recommendations may be represented or analyzed utilizing a tag space such as a multidimensional tag space. Vectors in the tag space may indicate proximity or similarity of entities, such as similarity between users in an implied social network. Such analysis may then be used in making recommendation determinations, such as by recommending to a user an item of interest to second user, the second user being proximate as represented in the tag space.

As mentioned, in some embodiments, social behavior is used in determining implied social networks, which can include topic-specific implied social networks. For example, in some embodiments, given any topic of interest, such as software, cooking, tourism, news, etc., a topic-specific implied social network can be determined using a statistical or algorithmic analysis of user social behavior, such as contributed or shared content, which may be relevant or associate with the topic. Users or profiles of users that exhibit commonalities, patterns, or associated behaviors with regard to the topic may be determined to be in a particular implied social network.

Furthermore, semantically sensitive vocabulary taxonomies may be used in such analysis. For a simple example, a vocabulary taxonomy may include "baking" and "grilling" within the larger concept or topic of "cooking". Using this information, it may be possible to determine that users that indicate an interest in "baking" and other users that indicate an interest in "grilling" are in a particular implied topic-specific social network.

Still further, a verbal hierarchy of the vocabulary taxonomy may be used to explain recommendation rationale. For example, if the user interested in baking is also interested in a cookbook topic, site, etc., the cookbook topic, site, etc. may be recommended to the user who has an interest in grilling. With or associated with this recommendation, an explanation may be provided that includes the fact that a user (or a number of users) who also had an interest in cooking expressed an interest in the cookbook topic, site, etc.

In some embodiments, building new networks, such as implied social networks, and making determinations of recommendations includes assessing similarity of entities or factors that participate or have meaning in the networks, e.g., users, sub-networks, interests, topics etc. In some embodiments, meaning of each such entity is given in a space of tags or other social behavior, so that comparing vectors of such tags allows assessment of similarity of the objects represented by those vectors. This in turn, can be utilized in making recommendation determinations and recommendations.

One example of a type of statistical method that can be used includes a method utilizing a tag space or other social behavior space, as mentioned briefly above. For example, given a topic T, one may compute the distance between users $u_1$ and $u_2$ with respect to T by considering the web pages, photos, or other content that $u_1$ and $u_2$ labeled as relevant to T, in comparison to an average user. Content may be labeled in several ways: by tagging, by providing favorable feedback, or, in the case of user-contributed content such as blog posts, by considering the words in the text of the post. The distance is directional, and it is normalized to the [0,1] range. The distance function takes into account the agreement (overlap) and disagreement in content labeled as relevant by the two users, and may also account for corpus or group-wide importance of content to topic T (a notion similar to Inverse Document Frequency (IDF)). The strength of connection between users $u_1$ and $u_2$ in a determined implied social network (and whether they are in a particular implied social network) may be expressed or determined as or by a function of the distance between these two users.

As mentioned above, some embodiments utilize a determined or generated vocabulary or vocabulary taxonomy. For example, in some embodiments, Given a social network (whether implied, explicit, or a combination of both) a vocabulary can be derived or generated that represents a social network-specific meaning that is common to the users of that network. For example, the word "Java" may, in one network, refer to the programming language, and to a coffee brand in another. As another example the word "Casablanca" may refer to a film title in a network of Del.icio.us users who tag film-related Web sites, and to a city in a network of users who are interested in travel photos is the Yahoo! photo sharing site, Flickr. As yet another example, the word "menu" may refer to an element of a graphical user interface in a software network (a topic-specific social network), and to a food selection in a network of restaurant-goers. A derived or generated vocabulary or vocabulary taxonomy can capture various linguistic or semantic features, including predominantly syntactic features like synonymy, as well as the meaning assigned or associated with the terms by a particular social group.

As mentioned above, in some embodiments, recommendations may be accompanied by or associated with provided or visual explanations, annotations, or indications to the user of the rationale used in determining the recommended item or person, such as the reasoning behind the determination that the item may be of potential interest or relevance to the user. Hierarchical vocabulary taxonomies, which may be generated based for example on co-occurrence of tags between users, can be used. Such vocabulary taxonomies may be constructed based on, among other things (and, vice-versa, may help allow), determination of specificity of and hierarchy of tags.

In some embodiments, a generated vocabulary taxonomy may be enriched or augmented using vocabularies, words, or vocabulary or word taxonomies, from external sources. For example, the WordNet dictionary or the thesaurus associated with the Wikipedia.org Web site could be used to determine, associate, or connect synonyms, hyponyms etc. As a further example, common computing terms may be extracted from resumes of computer professionals from a Web site such as LinkedIn. As yet another example, a vocabulary specific to a given college on the Web site Facebook could include the school's mascot, teams, sports starts, popular subjects and professors etc., as obtained from the site.

In some embodiments, various forms of statistical, mathematical, or algorithmic techniques may be utilized in generating vocabulary taxonomies. For example, in some embodiments, statistical analysis can be used over textual content (any text that exists in a social network, e.g. blog posts, tags) to derive vocabularies that characterize an individual user or a social network. A vocabulary can be or include a weighted hierarchy of terms, and higher level terms may be referred to as topics. Weights may represent distance in a tag space, for example, between topics, sub-topics, and terms.

As one specific example, a vocabulary or vocabulary taxonomy may be represented as a collection of terms, e.g., [java web computing art]. For a vocabulary of size N, a context element C can then be described in a tag space by means of an N-ary vocabulary vector $V_C$, where $V_C[i] \in [0, 1]$ represents the affinity between C and $i^{th}$ vocabulary term. So, for example the vocabulary vector [0 0.5 0.33 1] for the vocabulary [java web computing art] indicates no affinity for "Java", maximum affinity for "art" and intermediate affinities for "web" and "computing". A cosine vector distance metric may then be used to compare elements in this space.

As mentioned above, embodiments of the invention can be used in connection with social behavior, including behavior associated with social Web sites. For example, embodiments of the invention can be used in connection with social content site, including sites through which users contribute, consume, and evaluate content. On such sites, users may exhibit social behavior both explicitly, such as by declaring friendship affiliations, etc., and implicitly, such as may be demonstrated or indicated by content consumption, creation, authoring, modification, or evaluation, or by navigation, tagging, bookmarking, etc. Shared, common, or associated behavior may be used to identify new or implied user networks, and to determine and recommend items, content, or persons of potential interest. A person of potential interest may include a person recommended for friendship, affiliation, contact, dating, etc.

An example of a social site with which embodiments of the invention may be used or applied is Del.icio.us. On this site, users form friendship networks, and bookmark and annotate Web pages with tags that may include individual words or phrases. Embodiments of the invention can be used to add to or augment a user's explicit friendship network by suggesting or determining new social ties or connections with other users, based on user tagging behavior, etc. The augmented network can used in determining and recommending new content, such as bookmarked URLs, that are or potential interest to a user, but currently unknown to the user.

In some embodiments, social behavior from which implied social networks may be determined include threads such as comments on blog posts, replies on sites such as Yahoo! Answers, postings about similar or related topics, etc. Such social behavior can also include common bookmarking or tagging behavior or patterns, such as users adding the same URL or URLs to their favorites, or bookmarking the same URLs with similar or related words, on sites such as Del.icio.us.

As mentioned above, some embodiments utilize a vocabulary taxonomy. Such vocabulary taxonomies can help organize, utilize, and converge vocabularies or social content sites. Although users may sometimes use odd or rare tags, vocabulary taxonomies can help put such tags into semantic context, such as by associating them with higher level terms, and to explain recommendations by reference to associated terms from the vocabulary taxonomy. This in turn can increase the user's appreciation and understanding of the potential relevance or interest to the user of the recommended item or person, and makes the recommendation rationale and process more transparent and clear to the user.

As mentioned above, implied social networks may be used in determining items or people to recommend to users. For example, a user's social networks may be used to recommend new content to the user. For example, in the Web site Del.icio.us, URLs may be recommended that are bookmarked and/or tagged most often among the user's social network. In some cases, such as when content is recommended in response to an explicit search request from the user, content similarity between the resource and the query may be accounted for in addition to popularity among the user's social network. In addition to popularity and content similarity, recommendations may also be prioritized based on recency. For example, date of a blog post, or date of the first tag the user associates with a URL in Del.icio.us may be included to prioritize recommendations.

In some embodiments, recommendations to users may be provided through a graphical user interface, such as included in a Web page for example, and may be accompanied by explanations of the rationale behind the recommendation. For example, a recommendation may be annotated with vocabulary that was used to derive or determine the recommendation. Such annotations may provide additional meta-data or context to the user, helping user understand the provenance or reasoning for the recommendation. Furthermore, the user can enrich the vocabulary by future tagging of additional content.

Figure 1:
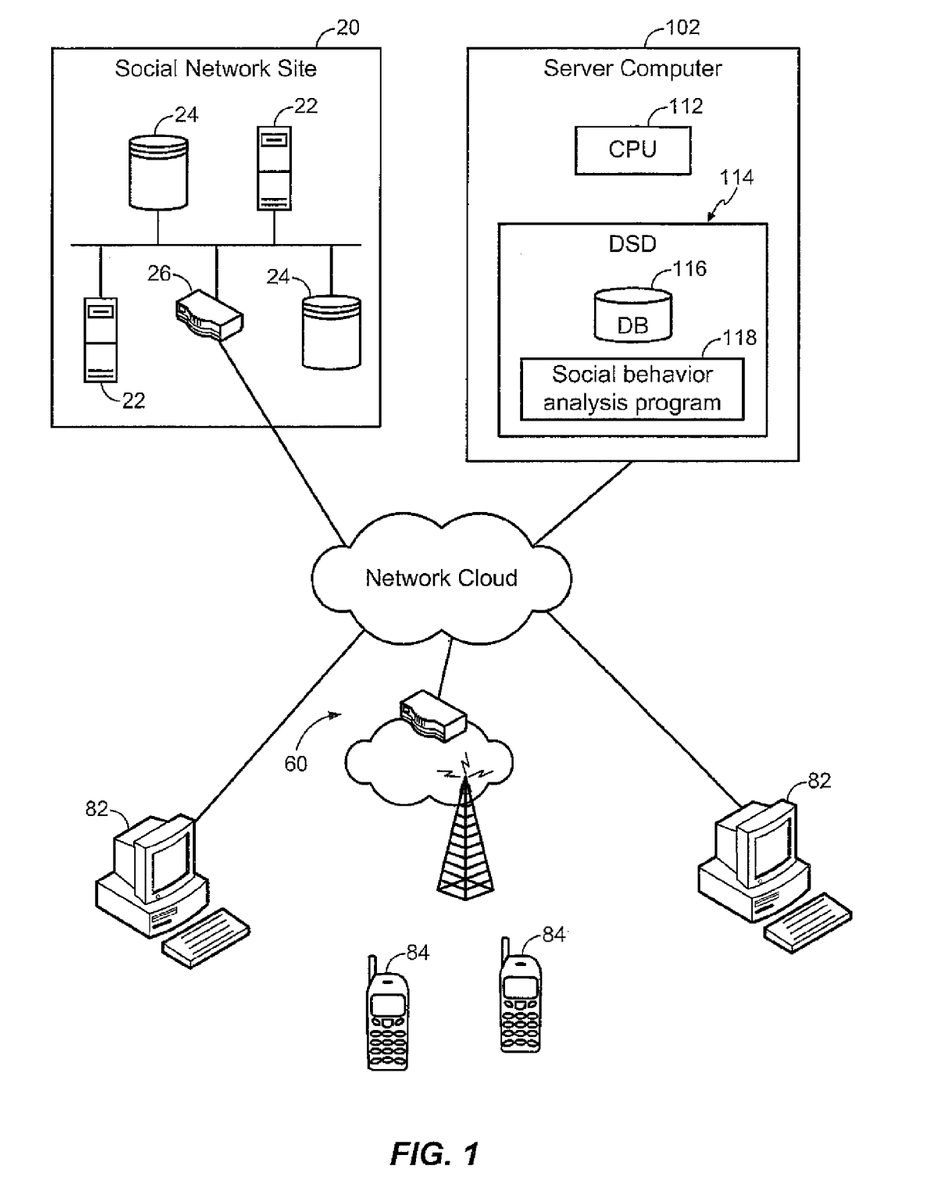
FIG. 1 illustrates an example network environment in which particular implementations may operate.

FIG. 1 illustrates an example network environment in which particular implementations may operate. Particular implementations of the invention operate in a wide area network environment, such as the Internet. As FIG. 1 illustrates, a particular implementations of the invention may operate in a network environment comprising a social network site 20 that is operatively coupled to a network cloud 60. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like. Client or user nodes 82 and 84 are operably connected to the network environment via a network service provider or any other suitable means. Client nodes 82 and 84 may include personal computers or cell phones, as well as other types of mobile devices such as lap top computers, personal digital assistants (PDAs), etc.

Social network site 20 is a network addressable system that hosts a social network application accessible to one or more users over a computer network. The social network application may include web site and server functionality where users may request and receive identified web pages and other content over the computer network. The social network application may also allow users to configure and maintain personal web pages.

In particular implementations, social network site 20 comprises one or more physical servers 22 and one or more data stores 24. The one or more physical servers 22 are operably connected to computer network 60 via a router 26. The one or more physical servers 22 host functionality that allows users to interact with the social network, such as uploading and retrieving content from client nodes 82 and 84. In one implementation, the functionality hosted by the one or more physical servers may include web or HTTP servers, FTP servers, and the like.

Physical servers 22 also host functionality directed to a social network site 20 described herein. In one implementation, a data store 24 may store user account information, including core information such as user identifiers, passwords, names, etc., as well as other user related information such as user profile data, addresses, preferences, financial account information, pointers to uploaded content and pointers to one or more modules for processing content, etc. A given data store 24 may also store content such as digital content data objects and other media assets. A content data object or a content object, in particular implementations, is an individual item of digital information typically stored or embodied in a data file or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Structurally, content data store 24 connotes a large class of data storage and management systems. In particular implementations, content data store 24 may be implemented by any suitable physical system including components, such as database servers, mass storage media, media library systems, and the like.

The server host systems described herein may be implemented in a wide array of computing systems and architectures. The following describes example computing architectures for didactic, rather than limiting, purposes.

Also connected to the network is server computer 102. The server computer 102 includes, among other things, a CPU 112 and a data storage device 114. The data storage device includes a database 116 and a social behavior analysis program 118. The social behavior analysis program 118 is intended to broadly represent all the programming, algorithms, software, modules, etc. utilized to carry out methods and techniques according to embodiments of the invention. In various embodiments, the social behavior analysis program 118 may stored on a single server, or multiple servers or other computers or devices.

Figure 2:
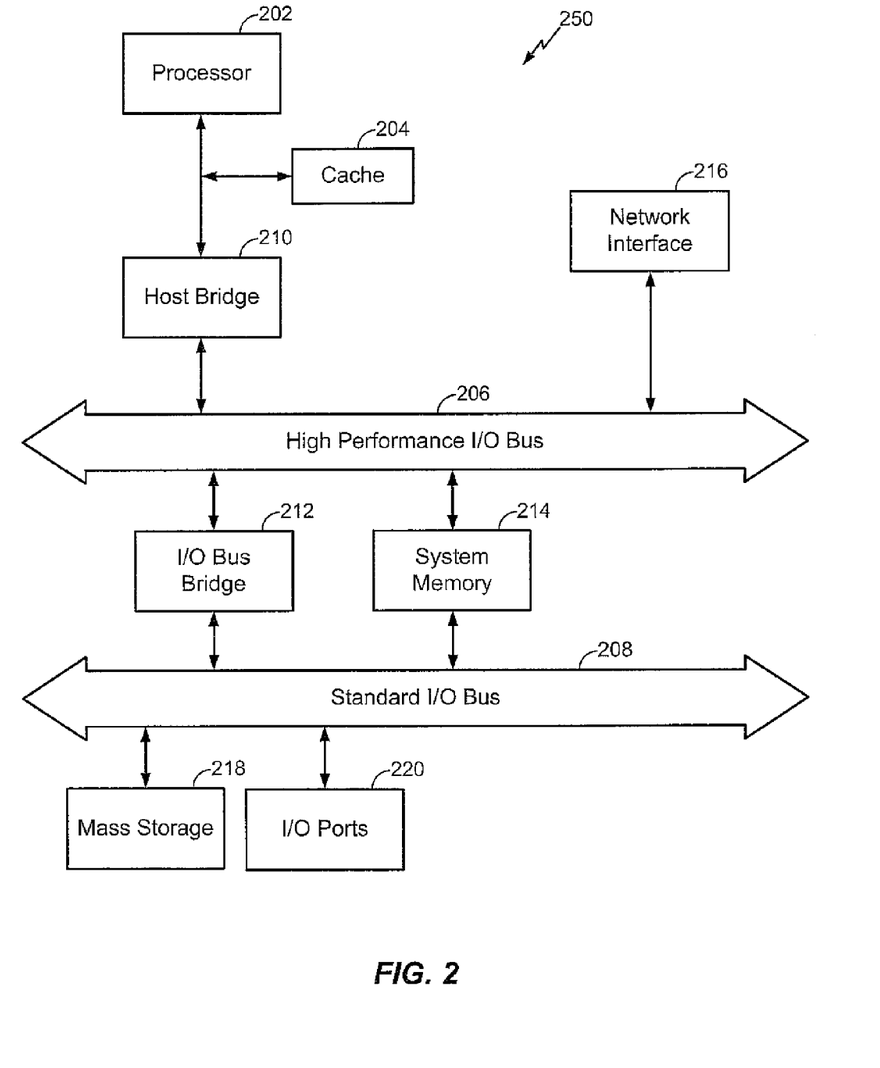
FIG. 2 illustrates an example computing system architecture, which may be used to implement a physical server.

FIG. 2 illustrates an example computing system architecture, which may be used to implement a physical server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist, with the components of hardware system 200 being coupled to the single bus. Furthermore, hardware system 200 may include additional components, such as additional processors, storage devices, or memories.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP/Vista operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

Figure 2A:
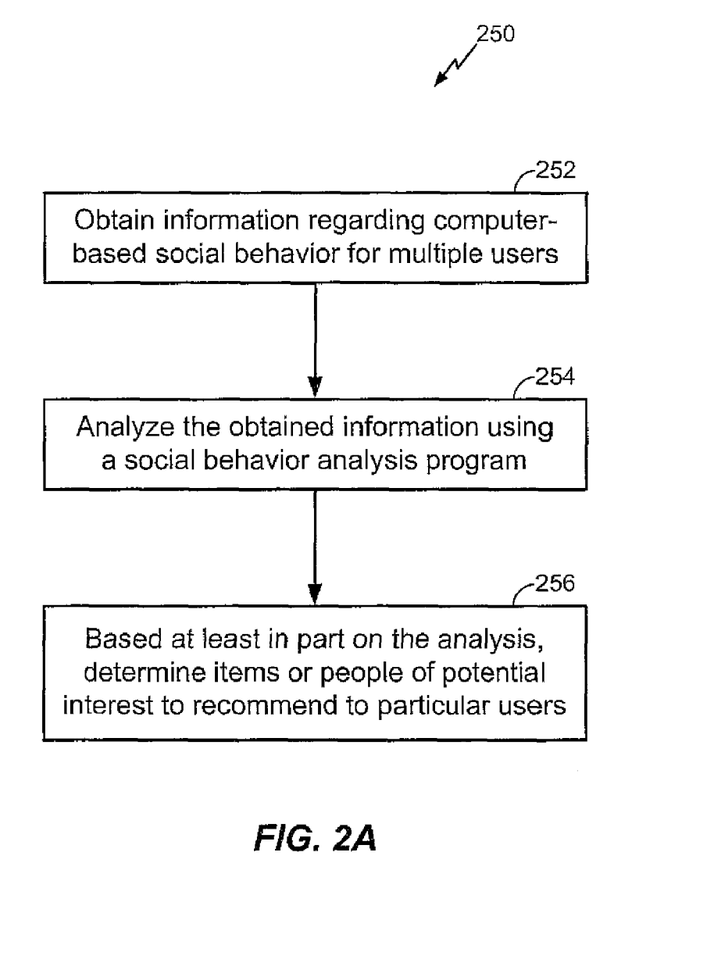
FIG. 2A is a flow diagram of a method according to an embodiment of the invention.

FIG. 2A is a flow diagram of a method 250 according to one embodiment of the invention. Step 252 includes obtaining information regarding computer-based social behavior for multiple users. Step 254 includes analyzing the obtained information using a social behavior analysis program. Finally, step 256 includes, based at least in part on the analysis, determining items or people of interest to recommend to particular users.

Figure 3:
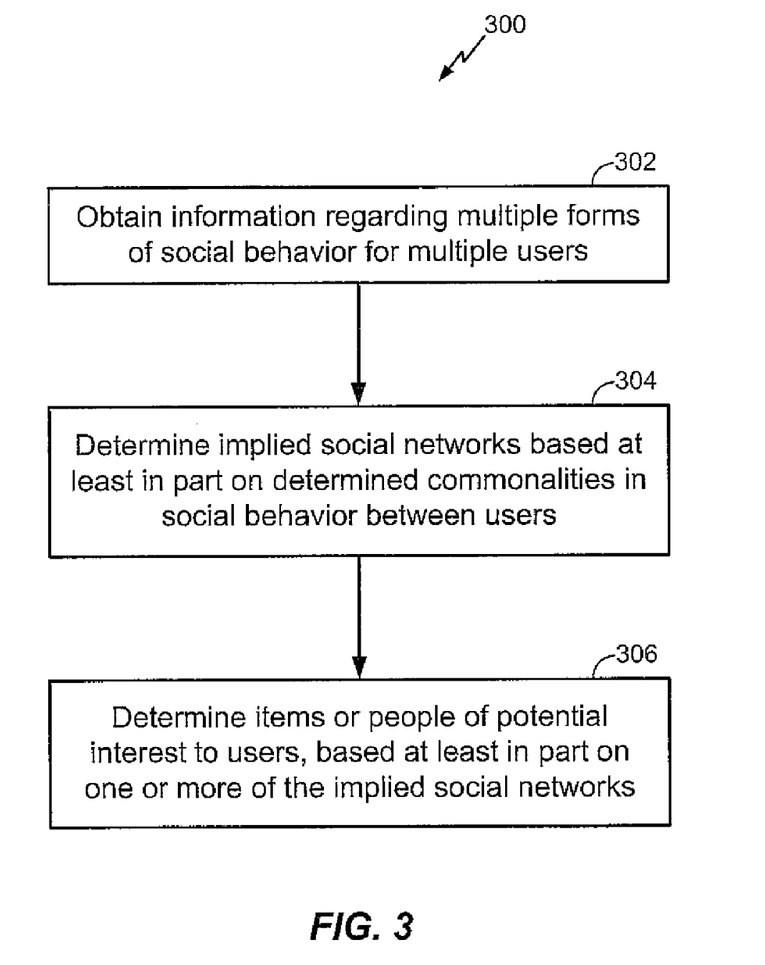
FIG. 3 is a flow diagram of a method according to an embodiment of the invention.

FIG. 3 is a flow diagram of a method 300 according to an embodiment of the invention. Step 302 includes obtaining information regarding multiple forms of social behavior for multiple users. Step 304 includes determining implied social networks based at least in part on determined commonalities or patterns in social behavior between users. Finally, step 306 includes determining items or people of potential interest to users based at least in part on one or more of the implied social networks.

Figure 4:
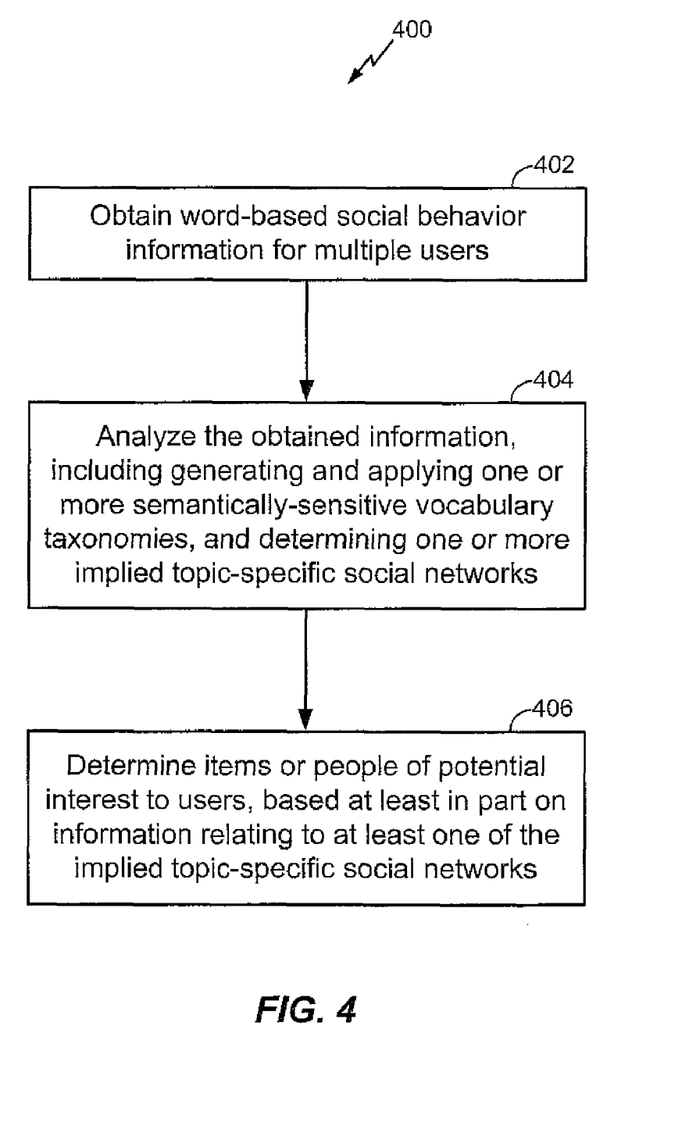
FIG. 4 is a flow diagram of a method according to an embodiment of the invention.

FIG. 4 is a flow diagram of a method 400 according to an embodiment of the invention. Step 402 includes obtaining word-based social behavior information for multiple users. Step 404 includes analyzing the obtained information. The analysis includes generating and applying one or more semantically-sensitive vocabulary-based taxonomies, and determining one or more implied topic-specific social networks. Step 406 includes determining items or people of potential interest to users based at least in part on information relating to at least one of the implied topic-specific social networks.

Figure 5:
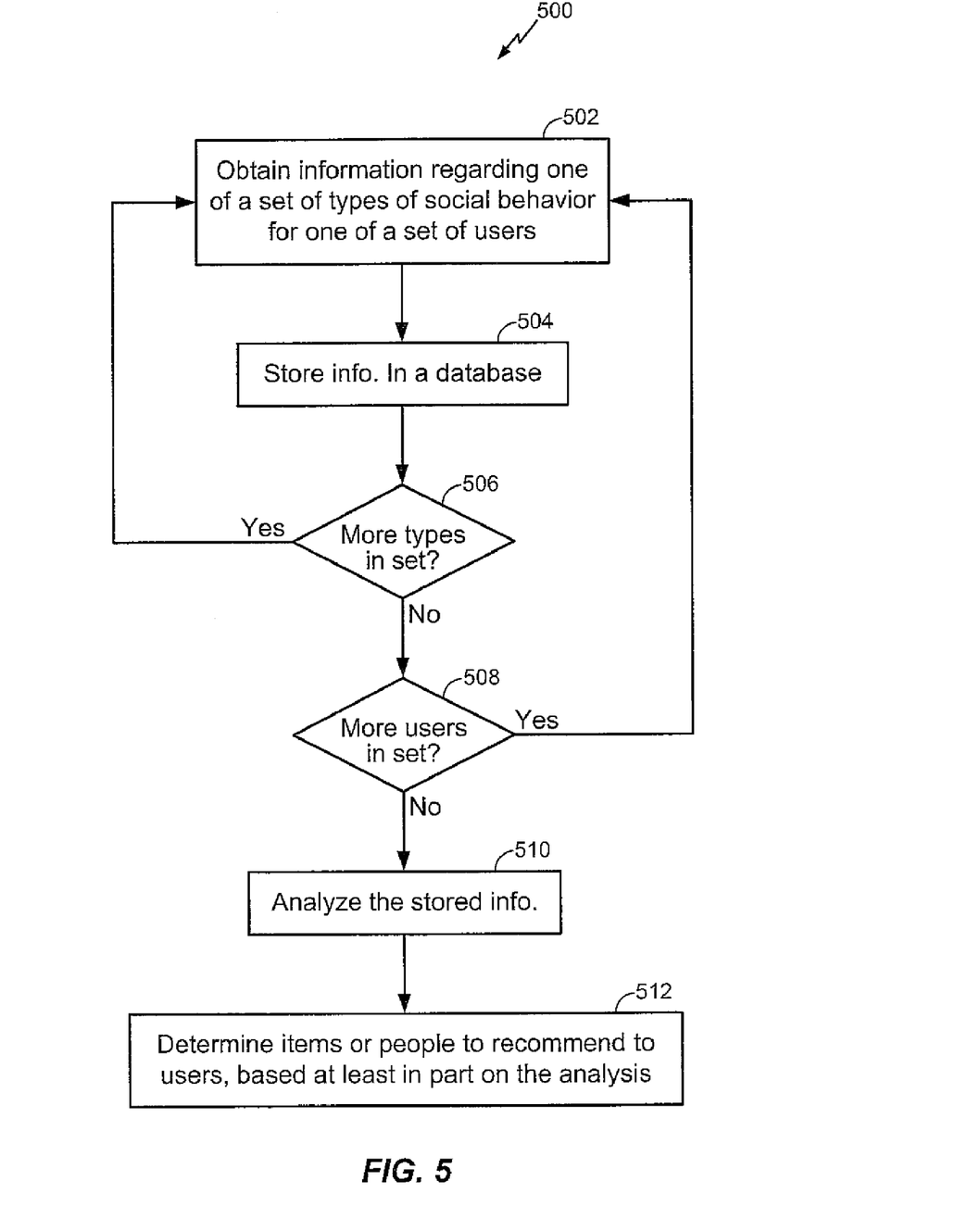
FIG. 5 is a flow diagram of a method according to an embodiment of the invention.

FIG. 5 is a flow diagram of a method 500 according to one embodiment of the invention. Step 502 includes obtaining information regarding one of a set of types of social behavior for a set of users. Step 504 includes storing the information in a database.

At step 506, the method 500 queries whether there are more types of social behavior in the set. If yes, then the method 500 returns to step 502 applied to a different type. If no, then the method 500 continues on to step 508.

At step 508, the method 500 queries whether there are more users in the set. If yes, then the method 500 returns to step 502, applied to a different user. If no, then the method 500 continues to step 510.

Step 510 includes analysis of the information using a social behavior analysis program. Finally, step 512 includes determination of items or people of potential interest to recommend to users, based at least in part on the analysis.

What is claimed is:

1. A method for determining items or people of potential interest to recommend to users in a computer-based network, the method comprising:
   obtaining information relating to one or more types of computer-based social behavior for multiple users;
   determining two or more implied social networks based at least in part on the obtained social behavior information;
   deriving a first taxonomy for a first implied social network and a second taxonomy for a second implied social network, in response to the determining two or more implied social networks, wherein a given term includes a first meaning within the first implied social network and the given term includes a second meaning, different from the first meaning, within the second implied social network; and
   determining one or more items or people of potential interest to recommend to a user, based at least in part on at least one of the two or more implied social networks.

2. The method of claim 1, wherein obtaining information relating to social behavior includes obtaining tagging behavior information.

3. The method of claim 1, wherein obtaining information relating to social behavior includes obtaining bookmarking information.

4. The method of claim 1, wherein obtaining information includes obtaining information relating to social behavior of users of the Internet.

5. The method of claim 1, comprising integrating the two or more implied social networks with one or more explicit social networks.

6. The method of claim 1, wherein determining two or more implied social networks comprises determining commonalities in social behavior between users.

7. The method of claim 6, comprising determining commonalities in social behavior between users based at least in part on one or more vocabulary taxonomies.

8. The method of claim 1, wherein determining items or people of potential interest comprises identifying content.

9. The method of claim 1, comprising recommending the items or people of potential interest.

10. The method of claim 9, wherein recommending includes providing a graphical user interface.

11. The method of claim 1, wherein determining one or more items or people of potential interest comprises analyzing social behavior information using a tag space.

12. A method for determining items or people of potential interest to recommend to users in a computer-based network, the method comprising:
   obtaining information relating to a plurality of types of computer-based, word-based social behavior for multiple users;

analyzing the obtained word-based social behavior information using a vocabulary taxonomy to determine two or more implied topic-specific social networks including a set of users of the multiple users;

deriving a first taxonomy for a first implied topic-specific social network and a second taxonomy for a second implied topic-specific social network, in response to determining the two or more implied topic-specific social networks, wherein a given term includes a first meaning within the first implied topic-specific social network and the given term includes a second meaning, different from the first meaning, within the second implied topic-specific social network; and determining an item or person of potential interest to recommend to a user of the set of users in at least one of the two or more topic-specific social networks, based at least on information relating to the at least one of the two or more topic-specific social networks.

13. The method of claim 12, wherein the analyzing step includes utilizing a semantically-sensitive vocabulary-based taxonomy developed in connection with the two or more topic-specific social networks.

14. The method of claim 13, wherein the determining step includes determining the item of potential interest to the user based at least in part on obtained social behavior information indicating items of interest to one or more other users in the at least one of the two or more topic-specific implied social networks.

15. The method of claim 14, wherein the determining step includes determining the item of potential interest to the user based at least in part on obtained social behavior information indicating popular items of interest among users in the at least one of the two or more topic-specific implied social networks.

16. A system for determining items or people of potential interest to recommend to users in a computer-based network, the system comprising;
   one or more server computers connected to a network; and
   a plurality of user computers connected to the network;
   wherein the one or more server computers include a computer-based social behavior analysis program, the program being for:
   obtaining information relating to a plurality of types of computer-based, word-based social behavior for multiple users of the plurality of users;
   analyzing the obtained word-based social behavior information using a vocabulary taxonomy to determine two or more implied, semantically-sensitive, topic-specific social networks including a set of users of the multiple users;

deriving a first taxonomy for a first implied, semantically-sensitive, topic-specific social network and a second taxonomy for a second implied, semantically-sensitive, topic-specific social network, in response to determining the two or more implied, semantically-sensitive, topic-specific social networks, wherein a given term includes a first meaning within the first implied, semantically-sensitive, topic-specific social network and the given term includes a second meaning, different from the first meaning, within the second implied, semantically-sensitive, topic-specific social network; and determining an item or person of potential interest to recommend to a user of the set of users in at least one of the two or more implied, semantically-sensitive, topic-specific social networks, based at least on information relating to the at least one of the two or more implied, semantically-sensitive, topic-specific social networks.

17. The system of claim 16, comprising a database for storing the information relating to social behavior.

18. The system of claim 16, wherein the network comprises the Internet.

19. The system of claim 16, wherein the social behavior information comprises at least one of tagging behavior or bookmarking behavior.

20. A computer program product, comprising a memory device comprising instructions for causing a processing unit to perform a method for determining items or people of potential interest to recommend to users in a computer-based network, the method comprising:
   obtaining information relating to a plurality of types of computer-based, word-based social behavior for multiple users;
   analyzing the obtained word-based social behavior information using a vocabulary-based taxonomy to determine two or more implied topic-specific social networks including a set of users of the multiple users;
   deriving a first taxonomy for a first implied topic-specific social network and a second taxonomy for a second implied topic-specific social network, in response to determining the two or more implied topic-specific social networks, wherein a given term includes a first meaning within the first implied topic-specific social network and the given term includes a second meaning, different from the first meaning, within the second implied topic-specific social network; and
   determining an item or person of potential interest to recommend to a user of the set of users in at least one of the two or more topic-specific social networks, based at least on information relating to the at least one of the two or more topic-specific social networks.

* * * * *